(12) United States Patent
Shymkiw

(10) Patent No.: US 6,695,367 B1
(45) Date of Patent: Feb. 24, 2004

(54) METHOD AND APPARATUS FOR ATTACHING A FENDER TRIM MOLDING WITHOUT DRILLING

(75) Inventor: Robert William Shymkiw, Calabasas, CA (US)

(73) Assignee: TFP, Inc., Cerritos, CA (US)

( * ) Notice: Subject to any disclaimer, the term of this patent is extended or adjusted under 35 U.S.C. 154(b) by 0 days.

(21) Appl. No.: 10/268,653

(22) Filed: Oct. 9, 2002

Related U.S. Application Data

(60) Provisional application No. 60/328,086, filed on Oct. 10, 2001.

(51) Int. Cl.[7] .............................................. B60R 19/42
(52) U.S. Cl. ........................ 293/128; 296/198; 24/295
(58) Field of Search ................... 296/198, 151, 296/207; 293/128, 120, 155; 280/847, 848, 849, 851, 154; 24/289, 295, 292, 293, 294

(56) References Cited

U.S. PATENT DOCUMENTS

| | | | |
|---|---|---|---|
| 2,761,232 A | * 9/1956 | Garver | 428/7 |
| 3,012,822 A | * 12/1961 | Mulhern | 301/37.31 |
| 3,888,532 A | * 6/1975 | Link | 293/128 |
| 3,970,346 A | * 7/1976 | Kretschmer | 24/295 |
| 4,062,580 A | * 12/1977 | West | 293/128 |
| 4,093,312 A | * 6/1978 | Kretschmer | 301/37.31 |
| 4,296,530 A | * 10/1981 | Muller et al. | 24/295 |
| 4,438,979 A | * 3/1984 | Renz et al. | 301/37.36 |
| 4,514,003 A | * 4/1985 | Guy | 293/128 |
| 4,724,585 A | * 2/1988 | Whitman | 280/848 |
| 5,139,306 A | * 8/1992 | Ott et al. | 296/198 |
| 5,618,060 A | * 4/1997 | Warren et al. | 280/848 |
| 5,967,553 A | * 10/1999 | Cominsky | 280/847 |

* cited by examiner

*Primary Examiner*—D. Glenn Dayoan
*Assistant Examiner*—Lori L Coletta
(74) *Attorney, Agent, or Firm*—Bryce Deary

(57) ABSTRACT

A system for attaching a fender trim molding piece adapted to be held firmly and removably in place by a combination of hooked mounting fasteners. The hooked ends of the mounting fasteners hold the edge of the fender wheel well opening. The flat end of the fasteners are inserted through mounting holes or slots in the fender trim molding and are then pulled through the holes with a tool such as common pliers. The fasteners are then bent back over the fender trim towards the hooked end thereby trapping the fastener and leaving the fender trim piece attached to the edge of the wheel well.

8 Claims, 4 Drawing Sheets

METHOD AND APPARATUS FOR ATTACHING A FENDER TRIM MOLDING WITHOUT DRILLING

This application claims benefit, under 35 U.S.C. 119(e), of U.S. provisional application No. 60/328,086 titled Method and Apparatus for Attaching a Fender Trim Molding Without Drilling, filed Oct. 10, 2001.

BACKGROUND OF THE INVENTION

1. Field of the Invention

The present invention relates in general to improved mounting and retaining system for securing decorative fender trim or fender flare molding around the perimeter of a vehicle fender wheel well opening. The system utilizes hooked or "L" shaped fasteners that are inserted through holes in the trim or molding after the trim is engaged at the fender edge at the wheel well opening. The end of the fastener inserted through the hole in the trim piece is then deformed usually by bending back towards the hooked end thereby trapping the fastener and holding the trim in secure attachment to the fender. The invention includes both the apparatus for attaching the trim to the fender, and the method used to so attach the trim to the fender.

2. Description of the Related Art

The systems currently used for attaching fender trim to a vehicle are complex, unreliable, expensive, and utilize holes drilled into the vehicle fender. The drilled holes are used in conjunction with bolts, screws, rivets, or other known elongated fasteners inserted through the holes and securing the molding trim in place. If the molding trim is later removed and not replaced, numerous unsightly holes would be left which would expose bare metal that would eventually form corrosion. This method of affixing fender trim limits sales demand for the product, due to its destructive consequences. The drilling of holes in sheet metal fenders breaks the integrity of the paint, primer and undercoating thus exposing the bear metal to extreme conditions on the road. The bare metal surfaces are vulnerable to rust and corrosion. Damage to the vehicle and possible violation of new vehicle warranty terms are two cited reasons why fender trim is often avoided by new and used vehicle dealers, thereby limiting the acceptance in what would otherwise be a natural market for the product.

Other systems currently in use involve utilizing adhesive or pressure insert fit systems/press-fit systems. This system addresses the problem of drilling, but is not reliable enough to substitute for drilling screw holes since it often won't stay secure for the required service life.

Installation of the trim moldings can also be problematic. Drilling holes in the often very limited space between the tire and the wheel well opening in the fender can increase costs to the installer due to the extra time and labor to just drill and tighten the screws. Special tools are required like angular power or cordless drills, riveting guns, offset screw drivers, special wrenches and new sharp drill bits of the proper size matched to the screws enclosed with the molding trim. Finally the rigid connection of the screws and molding trim of the prior art, often result in damage to the molding or fender flare in the event of even minor collisions or accidental blows.

What is needed is a way to attach fender trim to a vehicle, without drilling screw holes in the vehicle fender, that is strong, simple, reliable, secure and also economical. The disclosed invention addresses each of these needs by providing a quick and secure system of attachment with minimal tools and without the need for drilling into the vehicle.

SUMMARY OF THE INVENTION

To minimize the limitations in the prior art, and to minimize other limitations that will become apparent upon reading and understanding the present specification, the present invention discloses a method and apparatus for attaching a fender trim molding to the edge of the wheel well of a vehicle such as a car, truck, Sport Utility Vehicle (SUV), Recreational Vehicle (RV), trailer, or any other area where decorative molding(s) could be attached. In general, the invention discloses a pre-fitted semi-ridged or ridged fender trim molding piece adapted to be held firmly and removably in place by a combination of hooked mounting fasteners. The hooked ends of the mounting fasteners hold the edge of the fender wheel well opening. The flat end of the fasteners, opposite to the hooked end, are inserted through retaining holes or slots which are associated with the fender trim molding and are then pulled through the holes with a tool such as common pliers. The fasteners are then deformed usually by bending back over the fender trim towards the hooked end thereby trapping the fastener and leaving the fender trim piece attached to the edge of the wheel well. The molding trim is held against rattling loosely by distributing the combination of fasteners evenly throughout the length of the molding trim and by optionally placing extra fasteners in areas where extra forces such as wind are expected. Even distribution of fasteners also provides an even pressure thereby retaining the overall molding trim with minimal gaps between the molding trim accessory and vehicle fender.

A second embodiment of the invention modifies the hooked fastener to contain a slot adapted to receive a tab formed into or affixed to the trim piece. The trim piece is placed into position on the fender and fasteners are placed over the tabs and into interference with the inside of the fender at which point the tabs are deformed by bending the tab back towards the trim piece thereby locking the fasteners into place and holding the trim piece to the vehicle fender.

A third embodiment of the invention involves the use of a retaining fastener with some locking means to prevent the fastener from falling out or loosening. This embodiment would use a fastener with a hook end and a slot adapted to receive a locking strap or tab. The strap is passed through one or more holes on the fender trim and then through the slot in the hook. The locking strap is then pulled tight and locked into place by a locking clip or simply by bending in the case of a ridged tab. The excess strap material may then be trimmed. It is anticipated that the strap could be a strip of metal or a common plastic or nylon locking tie often referred to as a cable tie or zip tie.

In all described embodiments, the fastener may be adapted so that the hooked end conforms to the fender edge of the intended vehicle. The width and breadth of the contacting surface of the hook as well as the bending angle of the hook may be altered. For example, the hook portion may be rounded like a U or form an angle like a V or L or be formed to a contour that matches the inside fender surface. Finally, it is anticipated that the hook region could be strengthened by forming one or more ridges longitudinally through the hook.

The main object of this invention is to provide a system for attaching the molding trim to the fender without modifying the vehicle, as by drilling, and to minimize the use of special or expensive tools such as tools needed for work in confined spaces. The disclosed invention satisfies this requirement by providing a system of attachment that is simple, quick, and requires only a simple gripping tool such as a pair of pliers.

BRIEF DESCRIPTION OF THE DRAWINGS

Referring now to the drawings in which like reference letters represent corresponding parts throughout.

DETAILED DESCRIPTION

Figure 10:
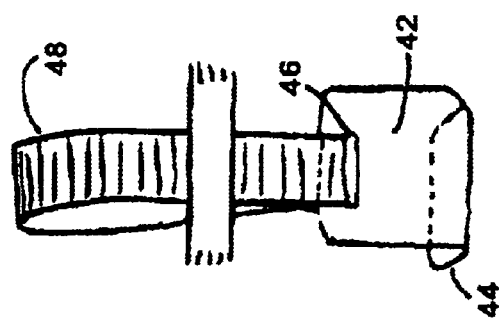
FIG. 10—discloses an alternate embodiment of a hook piece and a strap.

In the following description of the preferred embodiment, reference is made to the accompanying drawings that form a part hereof, and in which is shown by way of illustration one or more embodiments in which the invention may be practiced. It is to be understood that other embodiments may be utilized and structural changes may be made without departing from the scope of the present invention.

Overview

Decorative fender trim is the name given to pieces of molding that are affixed to a vehicle fender at the opening of the wheel well and typically conforms to the shape of the wheel well opening. A related product is the fender flare, which extends from the fender either away from the body of the vehicle or into the wheel well. While the general term used in this disclosure is fender trim, in most cases the invention may be adapted for use with fender flares or any other molding like product where disclosed conditions would allow the inventions use.

The molding can be manufactured from a variety of materials such a plastic, metal or wood. The molding is generally decorative in nature but in many cases, it must be structural since it is subject to wind loading when the vehicle is in motion. Each piece of molding is manufactured to fit a specific fender on a specific vehicle or family of vehicles and new molding are created for each new model year of vehicle.

Current methods of attaching the molding to the vehicle include traditional fasteners such as screws or rivets, as well as adhesive methods like glue or tape. The use of traditional fasteners is not desirable because holes must be drilled into the fenders of the vehicle thereby providing a potential corrosion point. Additionally it is often difficult to position drills or other tools into the sometime limited space between the vehicle wheel and the inside or underside of the fender. Adhesive methods do not provide a consistent method since different vehicles have different available bonding surfaces and might not provide enough area to form a secure bond.

The disclosed invention solves these problems by creating a system to (1) affix the fender trim without the need for drilling into the vehicle, (2) be adaptable to most vehicles, and (3) provide a very secure attachment between the fender trim and the fender.

Specifics of the Invention

In general, the invention discloses a fitted fender trim molding piece adapted to be held firmly and removably in place by a combination of hooked mounting fasteners. In a first embodiment, the fasteners are manufactured from a strong but malleable metal, often the same metal used to create the fender trim so as to avoid galvanic action. The hooked ends of the mounting fasteners hold or abut the edge of the fender in the wheel well opening. The flat end of each fastener is inserted through one or more retaining holes or slots that has been formed into or has been attached to the fender trim molding. The fasteners are then pulled through the holes with a tool such as common pliers and then bent back over the fender trim towards the hooked end, thereby trapping the fastener and leaving the fender trim piece attached to the fender in conformance with the edge of the wheel well. The molding trim is held against rattling loosely by distributing the combination of fasteners evenly throughout the length of the molding trim and by optionally placing extra fasteners in areas where extra forces such as wind are expected. Even distribution of fasteners also provides an even pressure thereby retaining the overall molding trim with minimal gaps between the molding trim accessory and vehicle fender.

A second embodiment on the invention involves the use of a retaining fastener with some locking means to prevent the fastener from falling out or loosening. This embodiment would use a fastener with a hook end and a slot to receive a locking strap. The strap is passed through one or more holes on the fender trim and then through the slot in the hook. The locking strap is then pulled tight and locked. The excess strap material may then be trimmed.

Figure 1:
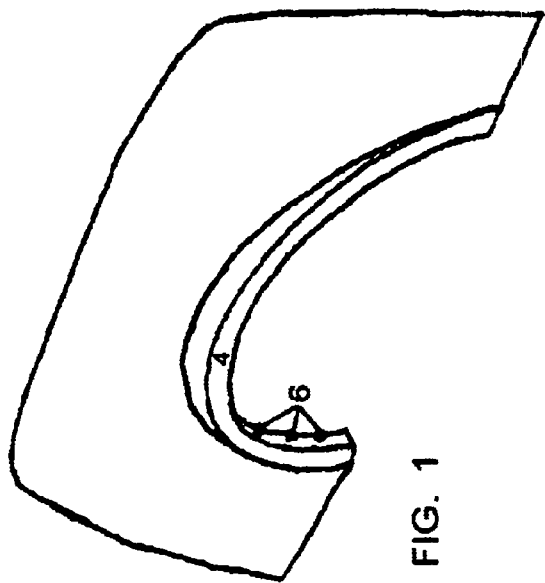
FIG. 1—is a side view of the front pattern of an automotive vehicle fender wheel well opening showing a decorative molding trim/fender flare.
Figure 2:
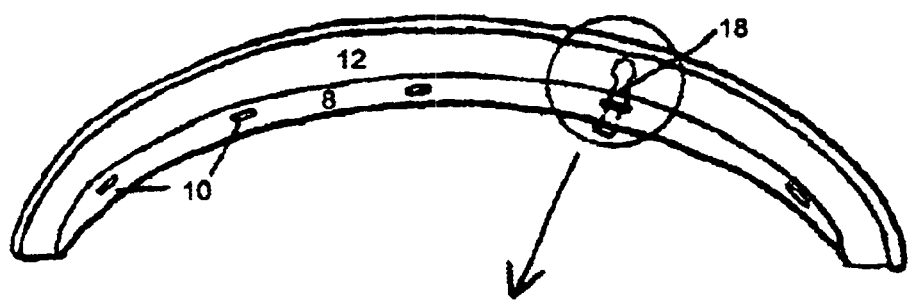
FIG. 2—is an underneath view of a single detached molding trim, with the flange face, facing frontward. The multiple female mounting slots are shown throughout the length of the molding trim.
Figure 8:
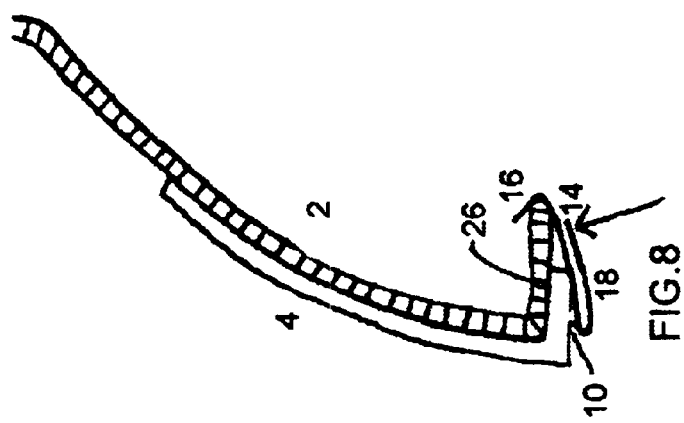
FIG. 8—is a side profile of wheel well molding as secured over wheel well fender corresponding side profile. Male mounting fastener is tightened and bent over towards the hook end of the fastener, to tuck neatly away from normal vision.

FIG. 1 shows a vehicle front right side fender with a decorative molding trim 4 properly mounted in position. The flange portion 8 of the molding contacts the flanged portion 26 of the wheel well fender opening. The multiple mounting fasteners 6 that fasten the molding trim 4 on to the fender 2 are flattened or bent back against the fastener or molding as shown in FIG. 8. The mounting fastener tabs are hidden from normal view. One embodiment is shown in FIG. 2, the molding trim has multiple slots 10 along the length of the flanged portion 8, each slot 10 to receive a fastener 18. FIG.

3 shows and enlarged area circled in FIG. 2, of a single female mounting slot 10 that receives a fastener 18. The fastener 18 has a hooked end 16 and an opposite tab end 14. When installed, the mounting fastener hook 16 makes contact or hooks the flanged portion of the fender wheel well 26. The tab end 14 of the male mounting fastener is pulled by pliers and tightened by wrapping or bending it back towards the hook end 16 of the fastener as shown by the directional arrow in FIG. 7. The hook end of the fastener 16 can be formed into any shape that will make good contact with the specific fender flange 26. Additionally, the bend angle formed between the hook portion 16 and the fastener body portion can range from 90 degrees down to just a few degrees.

Figures 3, 4:
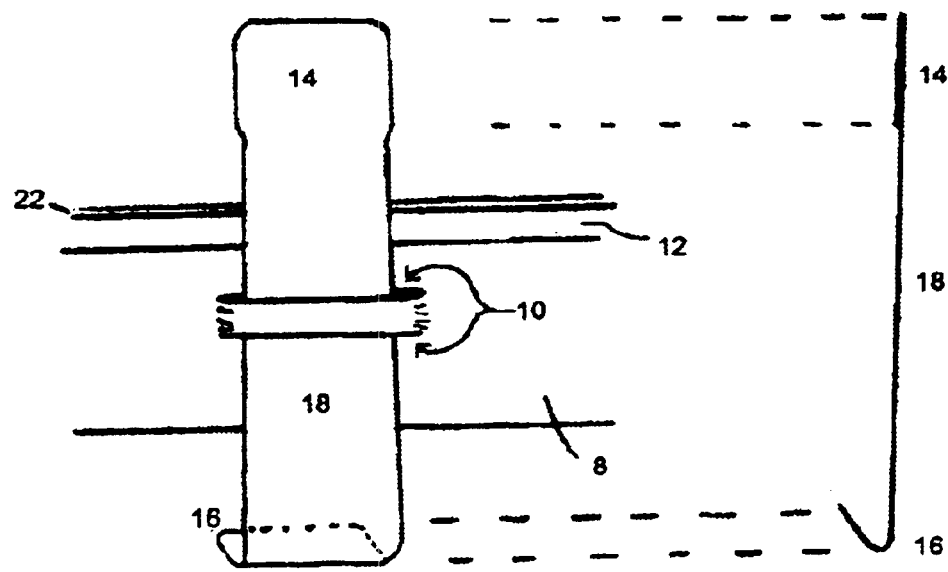
FIG. 3—is a close-up view of the circled area in FIG. 2. A male mounting fastener is shown engaging through the female mounting slots on the flange of the molding trim.
FIG. 4—is a side view of the male mounting fastener profile showing clearly the hook on one end. This figure is used also on FIGS. 4–8.

FIG. 4 shows a cross-sectional side profile of the male mounting fastener 18 with the hook 16 on one side and a tab end 14 on the other side which may be adapted for gripping with pliers. The body of the fastener 18 may have different cross sectional dimensions than the tab end 14 of the hook end 16 to facilitate bending. This fastener profile can be seen in FIGS. 5–8 which discloses one possible method of using the fastener to secure the molding trim 4 to the fender 2. It is important to note that the flange portion 8 of the molding trim abuts and is in contact with the of the flanged portion of the wheel well opening 26. The top of the molding trim merely rests against the fender 2. A rubber or plastic gasket 22 can be utilized to protect the fender paint if the molding trim is metal.

Figure 5:
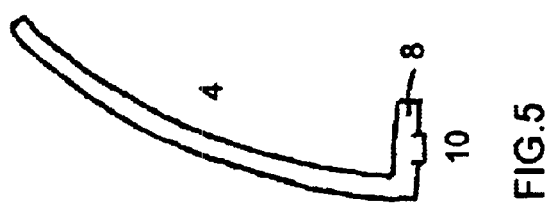
FIG. 5—is a side profile of the molding trim with female mounting slots on bottom.
Figure 11:
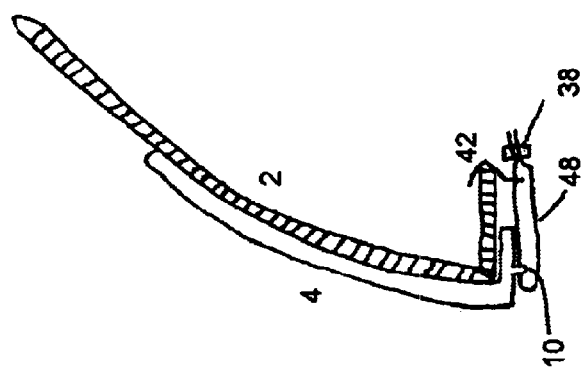
FIG. 11—side profile view of embodiment using strap.

FIG. 5 shows a cross-sectional side profile of the molding trim 4, which has the important feature of the mounting slot 10 at the bottom of the flange portion 8 of the molding trim.

Figure 6:
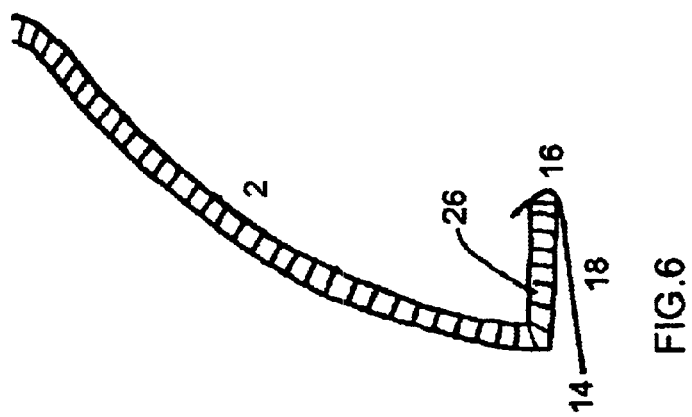
FIG. 6—is a side profile of fender with male mounting fastener hook engaged to grip edge of fender wheel well opening.

FIG. 6 shows a cross-sectional side profile of the fender 2 with the mounting fastener 18 at the bottom of the flanged portion 26 with its hooked end 16 around the edge of the fender. The tab end 14 of the mounting fastener may be constructed to permit a larger gripping area to facilitate gripping with a pair of pliers.

Figure 7:
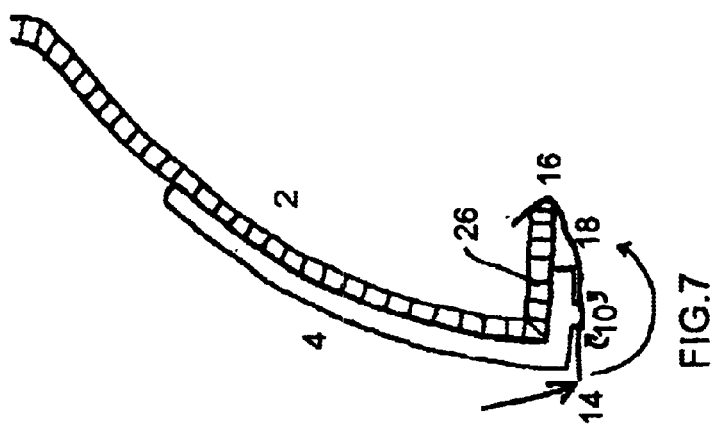
FIG. 7—is a side profile of molding trim as positioned over the corresponding fender wheel well. Male mounting fastener is inserted through female mounting slots.

FIG. 7 shows a cross-sectional side profile of the molding trim 4 positioned over the fender 2 along with the inserted mounting fastener 18 through the mounting slot 10. The arrow indicates the path of the tab end of the fastener 14, as it is bent over and back towards the hook end of the fastener 16. The fastener may be flattened against the hook end of the tab or the molding surface as shown in FIG. 8.

Figure 9:
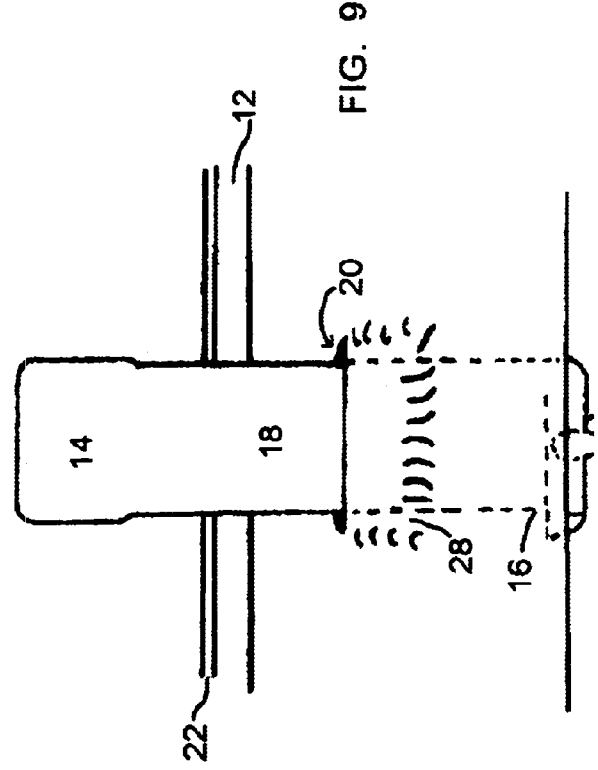
FIG. 9—is a close-up view of the circled area in FIG. 2, showing an alternate embodiment which utilizes a female mounting slot with a single notch or pierce in the molding trim. The figure also indicates an optional dimpled area adjacent to the slot.

FIG. 9 shows another embodiment, which consists of a single notched mounting slot 20 in the molding trim. This embodiment can be used in combination with or in place of the double-notched slot embodiment 10 seen in FIG. 3 and can be utilized for specific application areas with particular clearances such as when the edge of the molding extends beyond the flanged area of the fender. FIG. 9 also shows an optional dimple 28 adjacent to the single slot 20 to provide additional clearance for the fastener 18.

One additional embodiment would be the system of slots and tabs described above wherein the fastener 18 with hook end 16 and tab end 14 are manufactured from malleable metal which may be selected for its corrosion resistance properties when the trim molding is also manufactured from a metal. The mounting slots being constructed of straight and/or "V or U-shaped" double notches, pierced or stamped through the metal of the molding.

Another embodiment is to construct the parts from compatible metals as described in previous embodiments with the exception that one or more of the slot attachment points are constructed as a single opening 20 pierced or stamped in the molding. One or both edges of the slot or hole may be formed into a lip that is dimpled 28 above or below the surface of the molding, permitting the male mounting fastener 18 entry through the hole 20 in the molding trim. This variation is necessary for specific vehicle applications of this invention requiring special clearances in the molding trim flange faced and/or fender flange face.

Another embodiment of the mounting system herein described incorporates the substitution of a mounting hole formed by a bracket or ring which is then affixed to the molding trim flange portion 8 by methods such as but not limited to welding, soldering, spot-welding, glued or bonding. These separate affixed mounting holes may be used alone or in combination with single or double holes through the molding.

The dimensions of the fastener may be adjusted for different applications. For example the hook end 16 of the fastener may be widened to create a larger contact surface between the fastener and the fender flanged portion 26. The length of the fastener body would be adjusted to accommodate different vehicle fender flange depths. The size and thickness of the tab end of the fastener 14 can be adjusted to create an appropriate gripping surface.

The hook end of the fastener 16 may be strengthened to avoid bending by stamping or forming ridges in the hook portion which are parallel to the fastener body.

An additional embodiment of the invention modifies the hooked fastener to contain a slot adapted to receive a tab formed into or affixed to the trim piece. The trim piece may be manufactured to include tabs 40, as in FIG. 12, for example when cutting the steel to from the trim. Additionally, the tabs 40 could be affixed to the molding trim 4 after it is cut out. For example the tabs 40 could be welded or brazed or even glued onto the trim piece. The trim piece is placed into position on the fender and the fasteners are placed over the tabs and slid along the tab until they hook onto or abut the inside of the fender. The tabs are then deformed by bending the tab back towards the trim piece thereby locking the fasteners into place and holding the trim piece to the vehicle fender.

Figure 12:
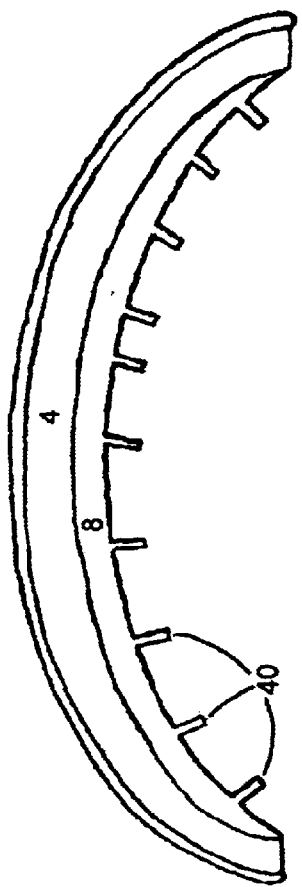
FIG. 12—discloses alternate embodiment of trim piece incorporating tabs.

A modification of the previous embodiment could be the exclusion of the hooked fasteners with slots, with the tabs 40 on the trim piece of FIG. 12 directly bent around the fender flange 26 thereby holding the trim piece in place.

Figure 13:
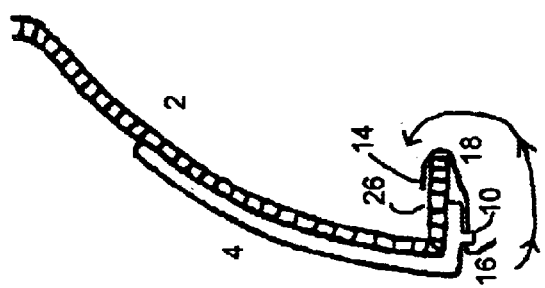
FIG. 13—discloses an alternate use of the fastener, with fastener inserted in the opposite direction than disclosed in FIG. 7.

A similar embodiment shown in FIG. 13, would include a molding trim 4 with slots as previous described, combined with the hooked fastener 18 being inserted into the slots of the molding trim so that the hooked end 16 engages the molding trim slot 10. The tab end 14 of the fastener is then bent around the fender flange 26 (as indicated by the arrow) thereby holding the trim piece in place on the fender 2.

Another embodiment of the invention involves the use of a retaining fastener with some locking means to prevent the fastener from falling out or loosening. This embodiment would use a fastener 42 with a hook end 44 and a slot 46 adapted to receive a locking strap 48 or elongated tab piece. The strap 48 is passed through one or more holes on the fender trim and then through the slot 46 in the hooked fastener 42. The locking strap 48 is then pulled tight and locked into place by a locking clip 38 or simply by bending in the case of a ridged tab. The excess strap material may then be trimmed. It is anticipated that the strap could be a strip of metal or a common plastic or nylon locking tie often referred to as a cable tie or zip tie. When using a tab, it is anticipated that one end of the tab would be pre-bent to keep it retained in the hooked fastener or in the trim piece while attaching its mating piece.

An additional embodiment of this mounting system in which the most basic principles of this invention are the same with the exception that some or all of the tabbed mounting fasteners are constructed of non-metal materials such as but not limited to plastic, fiberglass or nylon. Non-metal material may require the use of some form of retaining fastener to hold the fastener in place after it is threaded through and folded over the slots in the trim molding.

One additional embodiment of this invention, which expresses most basic principles of this invention, includes the exception that the molding trim is constructed of non-metal materials such as but not limited to plastic or fiberglass or other composite.

The method of using this system involving the steps of placing a prefabricated fender trim molding at the fender wheel well of a vehicle, placing the hook ends of one or more mounting fasteners against the inside flange of the fender while passing the tab ends of the fasteners through the holes in the molding, pushing the molding into tight contact with the vehicle fender, and bending the tabs of the fasteners back towards the hook end of the fastener and flattening or pressing the tabs into flush alignment with the face of the molding or hook end of the tab. The above might also include the additional step of placing a gasket material between the molding trim and the fender prior to placing the molding trim against the fender. This gasket has the advantage of protecting the fender and filling gaps between the fender and the trim piece. It also may provide some tensioning force on the tabs to prevent shaking or rattling.

An addition method when using a fastener in combination with a strap comprises: placing a prefabricated fender trim molding at the fender wheel well of a vehicle, placing a hook adapted to receive a strap or flexible fastener such as a zip tie, threading the strap or flexible fastener through a hole in the trim molding, and then locking the ends of the strap or flexible fastener together at or near the hook, and tightening the strap or flexible fastener.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

What is claimed is:

1. A decorative fender trim, removably attachable to a fender without drilling, comprising:
    one or more fasteners having a hooked end and a tab end which may be mechanically deformed,
    a fender trim piece having slots adapted to receive the tab end of said fasteners, the fender trim piece having an inner surface, which abuts a fender near an opening or edge, and a decorative outer surface.

2. The decorative fender trim of claim 1 wherein the tab end of at least one fastener passes through one slot fashioned in the fender trim piece and is then bent back towards the hooked end of the fastener.

3. The decorative fender trim of claim 1 wherein the tab end of at least one fastener passes through two slots fashioned in the fender trim piece and is then bent back towards the hooked end of the fastener.

4. The decorative fender trim of claim 1 wherein the fender trim piece is ridged and manufactured to conform to a specific fender shape.

5. The decorative fender trim of claim 1 wherein the fender rim piece is semi-ridged and is formed into an intended shape at the time of installation.

6. The decorative fender trim of claim 1 also comprising a gasket which is interspersed between the tender trim piece and the fender to provide protection to the fender and to fill gaps between the fender trim piece and the fender.

7. A method of attaching a decorative trim piece to a fender without drilling, including the steps of:
    (a) Placing the decorative trim piece in proximity to the fender, said trim piece being adapted to conform to the shape of said fender, and having slots to receive fasteners,
    (b) Placing one or more fasteners having a hook end and a tab end so that the hook end is engaged with an edge of the fender and the tab end passing through the one or more slots in the trim piece,
    (c) Pushing the trim piece into tight contact with the fender,
    (d) Bending the tab ends of the fasteners back towards the hook end of the fastener using a gripping tool.

8. The method of claim 7, also including:
Placing a gasket between the fender and the trim piece.

* * * * *